United States Patent [19]
Carnahan et al.

[11] 3,912,330
[45] Oct. 14, 1975

[54] CHEMICAL MINING OF COPPER PORPHYRY ORES

[75] Inventors: Thomas G. Carnahan, Sparks; Harold J. Heinen, Reno, both of Nev.

[73] Assignee: The United States of America as represented by the Secretary of the Interior, Washington, D.C.

[22] Filed: Mar. 4, 1974

[21] Appl. No.: 447,716

[52] U.S. Cl. .................................... 299/4; 423/34
[51] Int. Cl.$^2$ ........................................ E21B 43/28
[58] Field of Search .................................. 299/3–5; 423/27, 41, 150, 34; 75/101 R, 104

[56] References Cited
UNITED STATES PATENTS

| | | | |
|---|---|---|---|
| 287,737 | 10/1883 | Stetefeldt | 423/41 |
| 1,364,804 | 1/1921 | Rankin | 423/150 |
| 2,805,936 | 9/1957 | Schanfelberger | 423/41 |
| 3,330,648 | 7/1967 | Ortano et al. | 423/150 |
| 3,640,579 | 2/1972 | Lewis | 299/5 X |
| 3,793,429 | 2/1974 | Queneau et al. | 423/41 X |
| 3,793,430 | 2/1974 | Weston | 423/150 |

OTHER PUBLICATIONS
International Symposium on Hydrometallurgy, Evans et al., ed., Chapter 16, Feb. 25–Mar. 1.
Bjorling et al., "Oxidizing Leach of Sulfide Concentrates and Other Materials Catalyzed by Nitric Acid," Proceedings of IMPC, 1964, Vol. 1, pp. 127–138.

*Primary Examiner*—Frank L. Abbott
*Assistant Examiner*—William F. Pate, III
*Attorney, Agent, or Firm*—Roland H. Shubert; Donald R. Fraser

[57] ABSTRACT

Copper porphyry ores, especially those too deeply buried for conventional open pit mining, are mined in place by an in situ leaching technique using as a leaching medium a mixture of dilute sulfuric acid, oxygen and nitrate ion added either as nitric acid or as an alkali metal or ammonium nitrate salt. The nitrate ion speeds dissolution of copper minerals, especially chalcopyrite, and the alkali metal or ammonium ion reacts with iron and sulfate in the leaching medium to deposit iron in the form of crystalline jarosites. Precipitation of iron within the ore body as a jarosite maintains the permeability of the ore body to the leaching medium thus increasing both the rate and the total recovery of copper as well as depleting the leach solution of unwanted iron.

10 Claims, 1 Drawing Figure

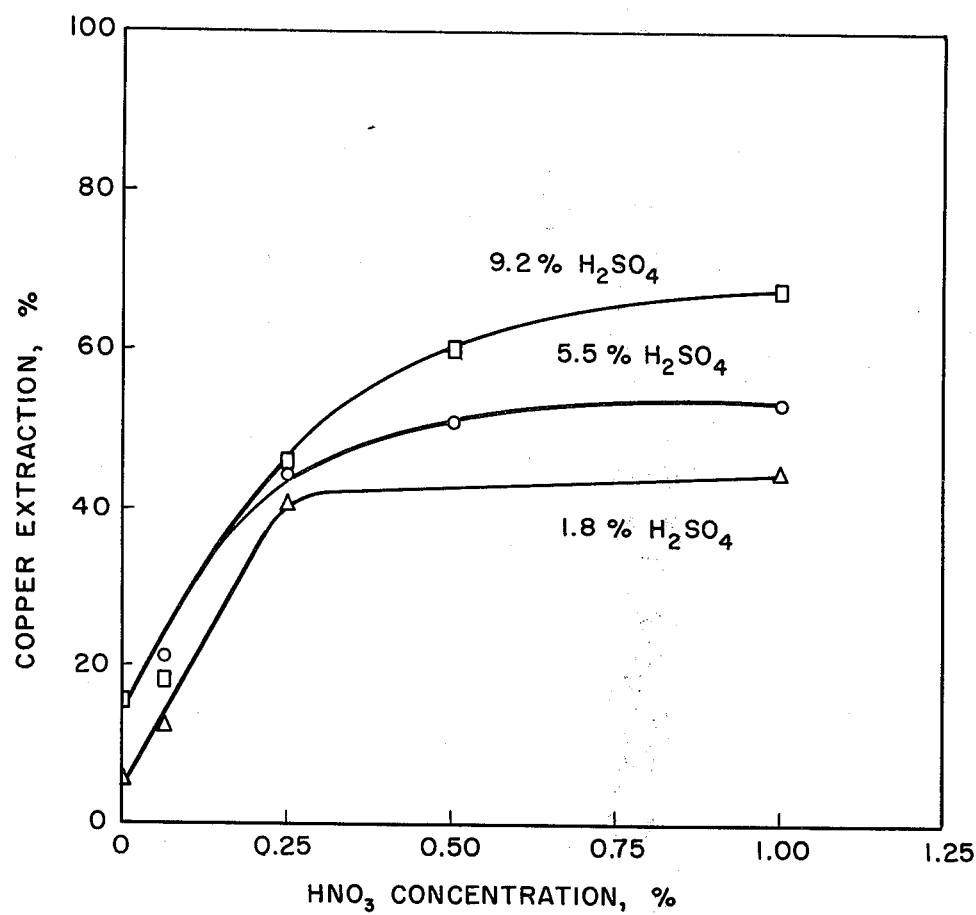

CHEMICAL MINING OF COPPER PORPHYRY ORES

BACKGROUND OF THE INVENTION

Many important copper deposits are in the form of low grade porphyry ores. A porphyry copper ore is a disseminated replacement deposit in which the copper minerals occur as discrete grains and veinlets throughout a large volume of rock which commonly is a porphyry. The deposits are typically large tonnage but low grade, having an average copper concentration of less than about 1 percent. Copper minerals found in these deposits are typcically sulfides and most commonly are chalcopyrite. When such a deposit is of sufficiently high grade and either outcrops on the surface or is sufficiently close to the surface, then the ore is mined by open pit methods and the copper minerals are separated from the gangue constituents by techniques such as flotation. Deeply buried or very low grade copper porphyry deposits cannot be economically exploited at this time.

It has been proposed to extract the copper from deeply buried porphyry deposits by in situ leaching techniques. In situ leaching is a well-known technique which has long been practiced; its origins can be traced as far back as the 15th century. Successful leaching operations at this time are restricted to those copper ore bodies containing copper in the oxide form and having a low percentage of calcareous minerals. Copper oxides such as azurite and malachite are readily soluble in dilute sulfuric acid. If high concentrations of calcareous minerals such as calcite and dolomite are present, then acid usage becomes so high as to make the process uneconomical.

Copper sulfide minerals in general are but very slowly and sparingly dissolved by dilute sulfuric acid. Of the copper sulfide minerals, chalcopyrite is probably the least soluble yet it is the most common copper sulfide. It is known that the use of an over-pressure of oxygen in conjunction with an aqueous sulfuric acid leach medium speeds the dissolution of the copper sulfide minerals. A description of such a technique was reported by Vizsolyi et al. in an article entitled "Copper and Elemental Sulfur from Chalcopyrite by Pressure Leaching" which was published in the *Journal of Metals*, Volume 19, No. 11 (1967), pages 52-59. Vizsolyi found that finely ground chalcopyrite concentrates could be dissolved in an autoclave using an oxygen partial pressure in the range of about 30-500 pounds per square inch at a temperature in the range of about 200° to 300°F. Most of the sulfide sulfur was oxidized to elemental sulfur and most of the iron contained in the chalcopyrite was eventually hydrolyzed during the leaching to ferric hydroxide. Other researchers have investigated the effect of nitric acid additions to sulfuric acid leach solutions in the extraction of copper from chalcopyrite concentrates. This work was reported by Prater el al in a paper entitled "A Nitric Acid Route to Processing Copper Concentrates" which was presented at the annual meeting, AIME, San Francisco, Calif., Feb. 21-24, 1972. Prater et al. worked with finely ground concentrates and investigated the effects of nitric acid concentration over the range of 10 to 60 percent; sulfuric acid concentration over the range of 0 to 2 molar and temperature over the range of 75° to 95°C.

A number of other references cite the effectiveness of nitric acid in the oxidation of copper sulfides. However, in a number of cases it was reported that iron, codissolved with copper, precipitated as iron hydroxide. Such precipitation of hydroxide within an ore body results in the formation of impervious layers which prevent movement of leach solutions. Hence, copper bearing minerals which are coated wtih precipitated iron salts have no contact with leach solutions and their copper content cannot be recovered no matter how long the leaching is continued.

SUMMARY OF THE INVENTION

We have found that the addition of catalytic amounts of nitrate ion added to an oxygenated sulfuric acid leach solution substantially increases the rate of copper extraction from copper sulfides contained in prophyry ones. Copper extraction rates obtained in leaching a chalcopyrite ore using a nitrate ion catalyst are 5 to 10 times greater than those obtained using an oxygenated sulfuric acid leach solution of the same concentration.

Nitrate ion may be added as nitric acid or as an alkali metal or ammonium nitrate salt. Catalytic activity is observed at nitrate ion concentrations in the leach solution as low as 0.05 percent. Little if any advantage is obtained by use of nitrate ion concentrations exceeding 0.50 percent. Addition of nitrate ion in the form of an alkali metal or ammonium nitrate salt or solution alleviates many of the handling problems involved in the use of nitric acid and provides a second substantial advantage. Presence of alkali metal or ammonium ions causes the precipitation of codissolved iron as a crystalline, sand-like jarosite which does not impede the flow of leach solution through the ore. In the absence of alkali metal or ammonium ions, codissolved iron tends to precipitate as gelatinous hydrated ferric oxides or mixed, hydrated ferric oxides and sulfates. Such precipitation starts to occur as the pH of the leach solution approaches about 3. Jarosite formation occurs at lower pH levels thus stripping the leach solution of ferric iron and preventing the formation of gelatinous precipitates even if the pH level of the leach solution rises to levels favoring such reactions.

Our process is especially well suited to the in situ leaching of deeply buried prophyry copper deposits which have been shattered by either conventional or atomic explosives. Essentially all of the codissolved ferric iron may be precipitated in situ as crystalline jarosites which do not impede the flow of the leach solutions. Pregnant leach solutions recovered in our process display very low iron concentration. In addition, most of the sulfur remains deposited within the ore body in the elemental form. A paper describing certain aspects of our invention and entitled "Simulated in Situ Leaching of Copper froom a Porphyry Ore" was published as Bureau of Mines Progress Report 62, dated May 1973.

Hence, it is an object of our invention to extract copper from porphyry ores.

A specific object of our invention is to provide an in situ leaching process to dissolve chalcopyrite and to deposit iron dissolved by the leach solution as a crystalline jarosite within the ore body.

DETAILED DESCRIPTION OF THE INVENTION

The invention will be described with reference to the accompanying drawing in which:

The FIGURE is a plot showing the catalytic effect of nitrate ion on the extraction of copper from a porphyry ore. It will be discussed in detail later.

We have discovered that nitrate ion, added in low concentration to a dilute sulfuric acid leach solution in combination with gaseous oxygen, speeds the dissolution of copper-iron sulfides such as chalcopyrite. Presence of nitrate ion in association with sulfuric acid increases the rate of dissolution of chalcopyrite by 5 to 10 times that obtainable using sulfuric acid and oxygen alone.

Further, if the nitrate ion is added to the leach solution as an alkali metal or ammonium salt, then codissolved ferric iron is precipitated from the leach solution as a crystalline jarosite. Jarosites are crystalline compounds having the general formula $MFe_3(SO_4)_2(OH)_6$ where M designates a cation chosen from the group consisting of sodium, potassium, and ammonium ions. All three of these compounds occur in nature and are typically found as sand-like crystals having a yellow or yellow-brown color. The crystals will spontaneously form in aqueous solutions containing ferric, sulfate, and alkali metal or ammonium ions at a solution pH of about 0.5 to 3 and temperatures above 60° to 70°C. Iron removal, as the jarosite, becomes more complete as temperature is increased to about 100° to 120°C. In practice, pregnant leach solutions obtained in the extraction of copper from a chalcopyrite-containing porphyry ore have displayed copper concentrations as high as about 50 g/l with an iron concentration below 100 ppm.

The important variables in our process are solution composition, temperature and oxygen pressure. Solution composition has a pronounced effect on copper extraction as well as on the precipitation of codissolved iron as crystalline jarosites. Sulfuric acid concentration in the leach solution must be sufficient to maintain the pH below about 3 in order to dissolve the copper sulfide minerals and to prevent the precipitation of iron as gelatinous hydroxides and sulfates. Much higher acid concentrations are preferred and the pH of the entering, or lean, solution may be pH 1 or below. Sulfuric acid may be added directly to the leach solution or, if pyrite is present in the deposit, sulfuric acid will be generated by oxidation of the pyrite during the leach cycle.

Nitrate ion must be present in the leach solution in catalytic amounts, or greater than about 0.05 percent by weight. There is little if any advantage gained in speeding copper sulfide dissolution by exceeding a nitrate ion concentration of about 0.50 percent. However, the concentration of sodium, potassium, or ammonium ion in the leach solution should at least be sufficient to provide stoichiometric amounts of those ions for the precipitation of codissolved ferric iron as a jarosite in order to maximize iron removal from the leach solution. Depending upon the dissolvable iron content of the ore, it may be desirable to add nitrate ion in the form of an alkali metal or ammonium salt at concentrations substantially exceeding the catalytic requirements of the process in order to fulfill the compositional requirements for iron removal by jarosite formation.

As has been previously stated, the temperature of our leaching process must be above about 60°C in order to obtain satisfactory rates of dissolution of copper-iron sulfides and to allow precipitation of jarosites. An upper temperature limitation of about 150°C is placed on our process because of the catalytic reactions occurring. We postulate that reactions occurring in our process can be generally described as follows: Nitrate ion in association with sulfuric acid reacts with the sulfide moity of a copper-iron sulfide such as chalcopyrite to oxidize the sulfide to elemental sulfur thus leaving the associated copper and iron in readily dissolvable forms. This reaction may be represented as follows:

$$3S^{2-} + 8H^+ + 2NO_3 \rightarrow 2NO + 3S + 4H_2O$$

Nitric oxide thus produced is regenerated immediately and this regeneration reaction may be summarized by the following two equations:

$$2NO + O_2 \rightarrow 2NO_2$$

$$3NO_2 + H_2O \rightarrow 2HNO_3 + NO$$

Temperatures below about 150°C and high pressures favor these reactions.

The first equation represents sulfide sulfur as being oxidized to the elemental form. Competing reactions, also temperature dependent, further oxidize as least a portion of the sulfide sulfur to the sulfate state. Generally it is advantageous to seek the maximum conversion of sulfide sulfur to elemental sulfur as that alleviates a problem of waste disposal and treatment. Elemental sulfur formed remains to a large extent within the interstices of the leached ore. Maximum conversion of sulfide sulfur to elemental sulfur in our process appears to occur at temperatures of about 100°C. Higher or lower temperatures tend to decrease the proportion of elemental sulfur formed.

Free oxygen in association with our leach solution performs the function of oxidizing sulfide sulfur to the elemental form and in some cases to the sulfate form. At least a part, and perhaps most, of the oxidation reaction proceeds indirectly through the reaction of nitrate ion with sulfides followed by the oxidation of nitric oxide to nitrate. Another chemical reaction taking place during leaching is the oxidation of pyrite to produce sulfuric acid and ferrous sulfate which in turn is further oxidized to ferric sulfate. The ferric sulfate-sulfuric acid solution, in association with oxygen, then dissolves chalcopyrite and other copper sulfide minerals present in the porphyry ore. Oxygen over pressure has a definite effect on the rate of oxidation and dissolution of chalcopyrite when using the nitrate ion catalyzed-sulfuric acid leach solutions of our process. As a general rule, the higher the pressure the faster the chalcopyrite dissolution. The increase in dissolution rate of chalcopyrite caused by an increased oxygen over pressure is more pronounced at lower temperatures than at high temperatures. Enough oxygen must be provided to oxidize sulfide sulfur contained in the ore to stable forms which may be elemental sulfur or sulfate. We prefer to operate our process with oxygen over pressures of at least 25 psi. Little increase in dissolution rate of chalcopyrite was observed at oxygen over pressures greater than about 200 psi. However, such higher pressures may be used. Oxygen may be supplied as air, oxygen enriched air, or pure oxygen.

Because of the limitations of temperature and oxygen over pressure, our process is not feasible for use in conventional surface heap leaching. While our process can be practiced in an autoclave-type reactor, such use would seldom be economically practical because of the low value of copper porphyry ores. Our process is, however, admirably suited for use in the in situ leaching of copper porphyry deposits; particularly deeply buried porphyry deposits which cannot be economically worked by conventional methods.

Porphyry ore deposits seldom if ever have sufficient natural permeability to either liquids or gases to allow a successful leaching operation to proceed. Hence, an extensive fracture system must be created within the ore body before leaching. Fracturing has been accomplished by the use of conventional chemical explosives as well as by hydraulic means. It has also been proposed to fracture deep ore bodies by means of nuclear blasting. This technique has been shown to be practicable in the test known as the Piledriver event which was conducted in granite. Such a nuclear blast creates a vertically oriented, cigar-shaped, fractured chimney caused by overlying rocks collapsing into the spherical shaped blast zone of the nuclear explosive. A substantial proportion of the rock sizes within the fracture chimney would have sizes of −12 inches in diameter and would display many more micro fractures than rocks shattered by conventional blasting because of the intense shock waves created by the nuclear blast.

Initial temperatures within the shattered ore zone are dependent upon the depth of the ore body, the local geothermal gradient and the method of blasting. Typical initial temperatures within the fractured ore body would be in a neighborhood of 60°C. Oxidation of the pyrite and chalcopyrite minerals with its attendant release of heat would further raise temperatures within the ore body to an expected level of about 150°C or even higher. Temperature of the ore body can be controlled to some degree by either heating or cooling the leach solution as is appropriate. Hydrostatic pressures within the fractured ore body are a function of depth of the fractured zone and are on the order of 1,000 psig at 2,000 foot depth. Leaching of the fractured ore body is accomplished by introducing oxygen and barren leach solution through wells from the surface to the base of the fractured zone. Other wells communicating between the surface and top of the fractured zone recover pregnant leach solution and vent gas accumulating at the top of the zone. The pregnant leach solution is then processed at the surface to remove its dissolved copper and is recycled back to the leaching zone. Recovery of copper from the pregnant leach solution may be accomplished by such conventional techniques as cementation, precipitation, and electrowinning. Of these approaches, electrowinning is preferred because the pregnant leach solution, being low in iron, is a desirable feed for that operation. Electrowinning also has the advantage of regenerating sulfuric acid for recycle to the leaching zone.

The following examples serve to more fully illustrate the effect of process variables on the practice of our invention.

EXAMPLE 1

Samples of a porphyry copper ore were obtained from a Nevada copper mine. The principle copper mineral was chalcopyrite with some bornite. Little if any pyrite was present. About one-third of the iron values were combined with copper as chalcopyrite and about two-thirds of the iron was present as complex silicates. The principle ferruginous gangue material was epidote with smaller amounts of chlorite and biotite. Only trace amounts of calcite were present. Copper, iron, and sulfur contents of the ores were 1.1, 3.4, 1.0 percent respectively. A series of leaching tests were conducted on samples of the porphyry copper ore crushed to ⅜ of an inch diameter using three different concentrations of nitrate ion added to the leach solution as nitric acid. All tests were performed at 80°C under 1 atmosphere oxygen pressure. Leaching time in all cases was two weeks.

Results of these tests are presented graphically as the figure. As may be seen from the plot, significant catalytic activity was displayed at nitrate ion concentrations as low as about 0.05 percent. Little additional benefit was achieved by use of nitrate ion concentrations exceeding about 0.50 percent.

EXAMPLE 2

Additional tests were carried out to delineate the effect of oxygen pressure upon the dissolution of chalcopyrite contained in the porphyry ore used in Example 1. Crushed ore charges were leached at oxygen pressures of 1 and 14 atmospheres at 80°C for one day using three different leach solution compositions. Results obtained are shown in the following table.

| Leachant Composition | Copper Extraction, % | |
|---|---|---|
|  | 1 atm. $O_2$ | 14 atm. $O_2$ |
| 1 M $H_2SO_4$ | 1 | 7 |
| 1 M $H_2SO_4$ + 0.44% $NO_3^-$ | 12 | 22 |
| 1 M $H_2SO_4$ + 0.88% $NO_3^-$ | 18 | 27 |

These results indicate that increasing oxygen overpressure increases copper extraction. They also indicate the substantial increase in rate of copper extraction attained by the addition of nitrate ion to the sulfuric acid-oxygen leach system. These examples are for the purpose of more fully describing and illustrating our invention. Minor variations and changes will be obvious to those skilled in the art.

We claim:

1. A process for extracting copper from a buried porphyry ore body containing chalcopyrite which comprises:

fracturing a zone within said ore body;

contacting ore in said fractured zone with a leach solution comprising an aqueous mixture of sulfuric acid and a catalytically effective amount of nitrate ion in the presence of free oxygen at a temperature within the range of 60° to 150°C for a time sufficient to dissolve chalcopyrite contained in said ore;

separating copper-containing leach solution from the ore, and recovering copper from the leach solution.

2. The process of claim 1 wherein leaching of the fractured ore body is accomplished by introducing barren leach solution and oxygen through wells communicating between the surface and the base of the fractured ore zone and wherein pregnant leach solution and gases are removed through wells communicating between the surface and the top of the fractured ore zone.

3. The process of claim 2 wherein nitrate ion is present in the leach solution in a concentration exceeding 0.05 percent and is added to the leach solution in the form of a compound chosen from the group consisting of nitric acid, sodium nitrate, potassium nitrate, and ammonium nitrate.

4. The process of claim 3 wherein said nitrate ion is added to the leach solution in the form of a compound chosen from the group consisting of sodium nitrate, potassium nitrate, and ammonium nitrate.

5. The process of claim 4 wherein the pH of the leach solution while in contact with said ore is in the range of 0.5 to 3.0 to precipitate iron dissolved by said leach solution within the ore body as a granular, crystalline jarosite having the formula $M\ Fe_3(SO_4)_2(OH)_6$ wherein M is chosen from the group consisting of sodium, potassium, and ammonium ions.

6. The process of claim 5 wherein the concentration of the nitrate salt in the leach solution is in excess of that amount stoichiometrically required to precipitate as a jarosite all ferric ion dissolved by the solution.

7. The process of claim 6 wherein said nitrate salt is ammonium nitrate and wherein said ferric iron is precipitated as ammonium jarosite.

8. The process of claim 5 wherein the oxygen overpressure within the leaching zone is in excess of 25 psi.

9. The process of claim 5 wherein copper is recovered from the pregnant leach solution by electowinning and wherein barren leach solution comprising electrolyte from the electrowinning step is recycled to the fractured ore zone.

10. The process of claim 5 wherein the leaching step is carried out at temperatures of about 100°C thereby maximizing the conversion of sulfide sulfur to elemental sulfur within the fractured ore zone.

* * * * *